United States Patent
Shiraki

(10) Patent No.: US 9,077,834 B2
(45) Date of Patent: Jul. 7, 2015

(54) NON-TRANSITORY COMPUTER READABLE MEDIUM AND JOB MANAGING APPARATUS

(71) Applicant: KONICA MINOLTA, INC., Chiyoda-ku, Tokyo (JP)

(72) Inventor: Yoko Shiraki, Ebina (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 13/929,581

(22) Filed: Jun. 27, 2013

(65) Prior Publication Data
US 2014/0009788 A1    Jan. 9, 2014

(30) Foreign Application Priority Data

Jul. 3, 2012   (JP) .................................. 2012-149080

(51) Int. Cl.
*H04N 1/00* (2006.01)
*H04N 1/21* (2006.01)
*G06F 3/12* (2006.01)

(52) U.S. Cl.
CPC ......... *H04N 1/00477* (2013.01); *H04N 1/2166* (2013.01); *G06F 3/1259* (2013.01); *H04N 2201/3273* (2013.01); *H04N 2201/3223* (2013.01); *H04N 1/00068* (2013.01); *H04N 1/00076* (2013.01); *H04N 1/00832* (2013.01); *H04N 2201/214* (2013.01); *H04N 2201/218* (2013.01); *H04N 2201/3219* (2013.01); *H04N 2201/3222* (2013.01); *G06F 3/1207* (2013.01); *G06F 3/1285* (2013.01)

(58) Field of Classification Search
CPC ................................................ H04N 11/00477
See application file for complete search history.

(56) References Cited

U.S. PATENT DOCUMENTS

2003/0142353 A1 *   7/2003   Allen et al. .................. 358/1.16

FOREIGN PATENT DOCUMENTS

| JP | 2000075981 A | 3/2000 |
|---|---|---|
| JP | 2003-009048 A | 1/2003 |
| JP | 2003-078687 A | 3/2003 |
| JP | 2009-171395 A | 7/2009 |

OTHER PUBLICATIONS

KDirStat, Aug. 2006, "http://kdirstat.sourceforge.net/".*

(Continued)

*Primary Examiner* — Saeid Ebrahimi Dehkord
*Assistant Examiner* — Lennin Rodriguezgonzale
(74) *Attorney, Agent, or Firm* — Holtz, Holtz, Goodman & Chick PC

(57) ABSTRACT

Provided are a non-transitory computer-readable medium storing instructions and a job managing apparatus, for managing jobs of an image forming apparatus. The instructions cause a processor to perform the following operations. The operations include acquiring information about data jobs stored in a storing section of the image forming apparatus, and creating a graph and a list based on the information about the data of the jobs. The graph indicates the amount of usage of the storing section for each job type. The list includes a job item including job contents such as information of a job type, for each job. The operations further include controlling a display unit to display a job managing screen including the graph and the list and update the graph on the job managing screen in response to an operation on the list to delete one or more jobs.

17 Claims, 12 Drawing Sheets

(56) References Cited

OTHER PUBLICATIONS

Japanese Office Action dated Oct. 28, 2014, issued in counterpart Japanese Application No. 2012-149080.

"WinDirStat Helps You Visually Find Files Putting Pressure on Your Disk", TeraDas, Japan, Jan. 15, 2012, Internet URL: https://web.archive.org/web/20120630093017/http://terdas.net/archives/3119>.

* cited by examiner

FIG. 5A

| Hold Job | HDD Job | | | | | | | | |

Job ↓ 44

| STATUS | JOBTYPE | USER | NAME | PAGES | REMAINING | COPIES | BIN | START TIME | END TIME |
|---|---|---|---|---|---|---|---|---|---|
| 🖨 | Copy/Print | USER1 | job_1 | 10 | 10 | 10 | Auto | Sat Jan 01··· | Sat Jan 01··· |
| 🖨 | Print | USER1 | job_2 | 20 | 20 | 20 | MultiFoldMa··· | Fri Jul 01 0··· | Fri Jul 01 0··· |
| | Print | USER1 | job_1 | 10 | 10 | 10 | Auto | Sat Jan 01··· | Sat Jan 01··· |
| | Print | USER1 | job_2 | 20 | 20 | 20 | MultiFoldMa··· | Fri Jul 01 0··· | Fri Jul 01 0··· |
| | Form | USER1 | job_1 | 10 | 10 | 10 | Auto | Sat Jan 01··· | Sat Jan 01··· |
| | Scan | USER1 | job_2 | 20 | 20 | 20 | MultiFoldMa··· | Fri Jul 01 0··· | Fri Jul 01 0··· |
| | Copy/Print | USER1 | job_1 | 10 | 10 | 10 | Auto | Sat Jan 01··· | Sat Jan 01··· |
| | Copy/Print | USER1 | job_2 | 20 | 20 | 20 | MultiFoldMa··· | Fri Jul 01 0··· | Fri Jul 01 0··· |
| | Print | USER1 | job_1 | 10 | 10 | 10 | Auto | Sat Jan 01··· | Sat Jan 01··· |
| | Scan | USER1 | job_2 | 20 | 20 | 20 | MultiFoldMa··· | Fri Jul 01 0··· | Fri Jul 01 0··· |
| | Scan | USER1 | job_1 | 10 | 10 | 10 | Auto | Sat Jan 01··· | Sat Jan 01··· |
| | Print | USER1 | job_2 | 20 | 20 | 20 | MultiFoldMa··· | Fri Jul 01 0··· | Fri Jul 01 0··· |
| | Print | USER1 | job_1 | 10 | 10 | 10 | Auto | Sat Jan 01··· | Sat Jan 01··· |
| | Print | USER1 | job_2 | 20 | 20 | 20 | MultiFoldMa··· | Fri Jul 01 0··· | Fri Jul 01 0··· |

| STATUS | JOBTYPE | USER | NAME | PAGES | REMAINING | COPIES | BIN | START TIME | END TIME |
|---|---|---|---|---|---|---|---|---|---|
| | Copy/Print | USER | job_1 | 10 | 10 | 10 | Auto | Sat Jan 01··· | Sat Jan 01··· |
| | Copy/Print | USER1 | job_2 | 20 | 20 | 20 | MultiFoldMa··· | Fri Jul 01 0··· | Fri Jul 01 0··· |
| | Copy/Print | USER | job_1 | 10 | 10 | 10 | Auto | Sat Jan 01··· | Sat Jan 01··· |
| | Print | USER1 | job_2 | 20 | 20 | 20 | MultiFoldMa··· | Fri Jul 01 0··· | Fri Jul 01 0··· |
| | Print | USER | job_1 | 10 | 10 | 10 | Auto | Sat Jan 01··· | Sat Jan 01··· |
| | Print | USER1 | job_2 | 20 | 20 | 20 | MultiFoldMa··· | Fri Jul 01 0··· | Fri Jul 01 0··· |
| | Print | USER | job_1 | 10 | 10 | 10 | Auto | Sat Jan 01··· | Sat Jan 01··· |
| | Print | USER1 | job_2 | 20 | 20 | 20 | MultiFoldMa··· | Fri Jul 01 0··· | Fri Jul 01 0··· |
| | Print | USER1 | job_2 | 20 | 20 | 20 | MultiFoldMa··· | Fri Jul 01 0··· | Fri Jul 01 0··· |
| | Scan | USER | job_1 | 10 | 10 | 10 | Auto | Sat Jan 01··· | Sat Jan 01··· |
| | Scan | USER | job_1 | 10 | 10 | 10 | Auto | Sat Jan 01··· | Sat Jan 01··· |
| | Scan | USER1 | job_2 | 20 | 20 | 20 | MultiFoldMa··· | Fri Jul 01 0··· | Fri Jul 01 0··· |
| | Form | USER1 | job_2 | 20 | 20 | 20 | MultiFoldMa··· | Fri Jul 01 0··· | Fri Jul 01 0··· |

```
SET DISPLAY CONDITION FOR DISPLAY AREA OF DETAILED LEVEL                45

* DEFAULT SETTING IS "SIZE OF SPACE"

☐  SIZE OF SPACE
    0 TO LESS THAN 1MB, 1MB TO LESS THAN 10MB, 10MB TO LESS THAN 50MB,
    50MB TO LESS THAN 100MB, 100MB AND MORE

☑  FREQUENCY OF USE
    UNEDITED, EDITED ONCE, EDITED TWO TO FIVE TIMES, EDITED SIX TO TEN TIMES,
    EDITED TEN OR MORE TIMES

☐  TIME OF DATA PROCESSING (REGISTERED DATE)
    THIS WEEK, LAST WEEK, THIS MONTH, LAST MONTH, OLDER THAN LAST MONTH

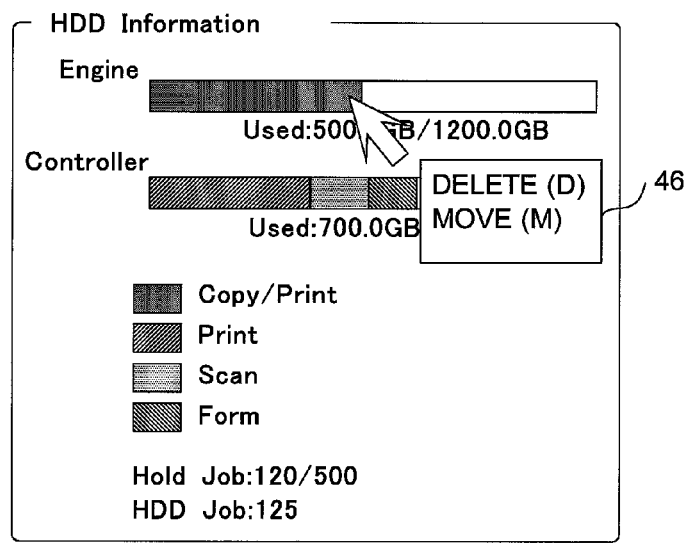

ved as shown in JP-A No. 2009-171395, it is possible to intuitively grasp the amount of usage and the amount of free storage of the HDD. However, JP-A No. 2009-171395 is a technique related to cameras, and the bar of the amount of usage and the amount of free storage of a HDD is not displayed for each job; thus, it is difficult to decide which job data should be deleted.

NON-TRANSITORY COMPUTER READABLE MEDIUM AND JOB MANAGING APPARATUS

This application is based on Japanese Patent Application No. 2012-149080 filed on Jul. 3, 2012, in the Japan Patent Office, the entire content of which is hereby incorporated by reference.

TECHNICAL FIELD

The present invention relates to a non-transitory computer-readable medium and a job managing apparatus, in particular, to a non-transitory computer-readable medium storing instructions for managing jobs of an image forming apparatus and a job managing apparatus for managing jobs in an image forming apparatus.

BACKGROUND

In an image forming apparatus such as a multi function peripheral (MFP) equipped with a plurality of functions including printing, copying, scanning, data generated by jobs executed using those functions are stored in a storing section such as an HDD (Hard Disk Drive) for a purpose of reuse and the like. A job managing apparatus for managing jobs of the image forming apparatus manages the status of the HDD, and secures, when the amount of usage of the HDD has been increasing, the amount of free storage of the HDD by deleting unnecessary jobs or other ways. In such occasions, when having no information of the free storage capacity of the HDD, the image forming apparatus hardly judges whether to delete data of jobs or not; thus, there are proposed various methods to simply display the amount of usage of the HDD and the amount of free storage of the HDD for easy judgment.

For example, Japanese Laid-Open Patent Application Publication (JP-A) No. 2003-078687 discloses, with respect to an image forming apparatus, that if the amount of free storage of a HDD is greater than a predetermined value, the amount of free storage is displayed in percentage and if the amount of free storage is smaller than the predetermined value, the amount of free storage is displayed in number of sheets. The document also describes that the amount of free storage of the HDD is displayed for each image forming conditions including color modes (full color, black-and-white, and the like) and image forming sizes (A3, A4, and the like).

This is not a technique related to a printing system, but JP-A No. 2003-009048 discloses, as a technique related to storing broadcast programs in a program recording apparatus, that the amount of free storage of a HDD is displayed in percentage, that the list of data already stored in the HDD is displayed on the same display screen, and that there is displayed a numerical value indicating what percentage of the data to be stored now can be stored in case that those stored data are deleted.

In addition, as a technique related to storing data in cameras, JP-A No. 2009-171395 discloses a system configured to send image data to a server and store the data into a HDD of the server. The system displays a bar of the unsendable data size and the sendable data size and a bar of the amount of usage of the HDD and the amount of free storage of the HDD, and changes, when an user has performed an operation of increasing the amount of free storage of the HDD while watching the list on the same screen, the contents of the bars.

However, with the method in which the amount of usage and the amount of free storage of a HDD are displayed in percentage or in number of sheets as shown in JP-A No. 2003-078687 and No. 2003-009048, it is difficult to intuitively grasp the amount of usage and the amount of free storage of the HDD. On the other hand, in the case that the amount of usage and the amount of free storage of a HDD are displayed as shown in JP-A No. 2009-171395, it is possible to intuitively grasp the amount of usage and the amount of free storage of the HDD. However, JP-A No. 2009-171395 is a technique related to cameras, and the bar of the amount of usage and the amount of free storage of a HDD is not displayed for each job; thus, it is difficult to decide which job data should be deleted.

In particular, since a HDD in an image forming apparatus stores various kinds of job data including print data (written in PDL (Page Description Language) such as PCL (Printer Control Language) and PS (Post Script)) sent from clients, image data generated by rasterizing these print data, image data read in by a scanning function, and form data, it is difficult to decide which job data to delete unless the amount of usage and the amount of free storage of a HDD are displayed based on proper sorting of those data.

Further, since an image forming apparatus stores various kinds of job data as described above, an image forming apparatus is equipped with a plurality of HDDs (or the HDD is divided into a plurality of areas), and stores data used by the engine executing printing process and data used by the controller executing image processing in different HDDs, for example. Thus, unless the amount of usage and the amount of free storage is displayed for each HDD, it is difficult to decide which piece of the job data stored in the HDDs should be deleted.

Further, for deleting job data stored in a HDD, it is necessary to display a list of jobs stored in the HDD and to confirm details of each job on the list; however, if the display of the amount of usage and the amount of free storage of the HDD and the list of the jobs are displayed on different screens, which make a user difficult to recognize which job should be deleted. As the result, it may cause a wrong operation such as deleting job data which does not need to be deleted, whereby there will be caused a problem that the operations for deleting job data becomes complex. The present invention seeks to solve the problem.

SUMMARY

There are disclosed illustrative non-transitory computer-readable media and job managing apparatuses.

An illustrative non-transitory computer-readable medium reflecting one aspect of the present invention is a non-transitory computer-readable medium storing instructions for managing jobs of an image forming apparatus. The instructions, when executed by a processor, cause the processor to perform the following operations. The operations comprise: acquiring information about data of jobs stored in a storing section of the image forming apparatus. The operations further comprise: creating a graph based on the information about the data of the jobs, where the graph indicates the amount of usage of the storing section for each job type. The operations further comprise: creating a list based on the information about the data of the jobs, where the list includes a job item representing job contents for each of the jobs and the job contents include information of a job type. The operations further comprise controlling a display unit communicably connected to the processor, to display a job managing screen including the graph and the list and to update an area of the graph on the job managing screen in response to an operation on the list to delete one or more of the jobs, where the area indicates the amount of usage of the storing section corresponding to a job type to which the one or more of the jobs belong.

An illustrative job managing apparatus reflecting one aspect of the present invention is a job managing apparatus for managing jobs of an image forming apparatus. The job managing apparatus comprises: a display section; and an information acquiring section configured to acquire information about data of jobs stored in a storing section of the image forming apparatus. The job managing apparatus further comprises a graph creating section configured to create a graph based on the information about the data of the jobs, where the graph indicates the amount of usage of the storing section for each job type. The job managing apparatus further comprises a list creating section configured to create a list based on the information about the data of the jobs, where the list includes a job item representing job contents for each of the jobs and the job contents includes information of a job type. The job managing apparatus further comprises a screen control section configured to control the display section to display a job managing screen including the graph and the list and update an area of the graph on the job managing screen in response to an operation on the list to delete one or more of the jobs, where the area indicates the amount of usage of the storing section corresponding to a job type to which the one or more of the jobs belong.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which:

FIG. 5A is a diagram illustrating an operation example on a list display area on a job managing screen according to an embodiment of the present invention;

FIG. 5B is a diagram illustrating a display example of a list display area on a job managing screen according to an embodiment of the present invention;

FIG. 8 is a diagram illustrating an example of a display screen, of an embodiment according to the present invention, for setting display conditions for a display area of a detailed level;

FIG. 9 is a diagram illustrating showing an operation example for deleting a job on the graph display area on the job managing screen of an embodiment according to the present invention;

DETAILED DESCRIPTION

Figure 1:
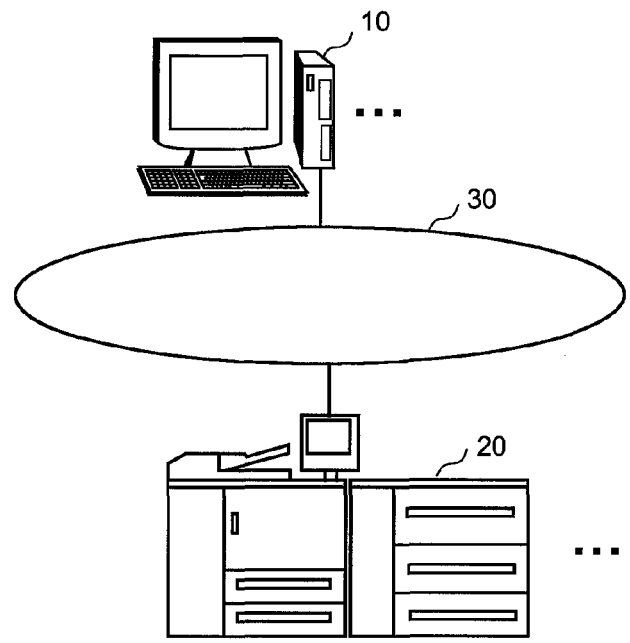
FIG. 1 is a diagram schematically illustrating a configuration of a printing system according to an embodiment of the present invention.

Illustrative embodiments of non-transitory computer-readable media and job managing apparatuses will be described with reference to the drawings. It will be appreciated by those of ordinary skill in the art that the description given herein with respect to those figures is for exemplary purposes only and is not intended in any way to limit the scope of potential embodiments may be resolved by referring to the appended claims.

With a non-transitory computer-readable medium and a job managing apparatus as embodiments of the present invention, jobs stored in an image forming apparatus can be managed simply and reliably.

The reason for that is because there are provided a non-transitory computer-readable medium storing instructions for managing jobs of an image forming apparatus as a job managing application causing a processor to perform the following operations, and a job managing apparatus configured to perform the following operations. The operations include acquiring information about data of jobs stored in a HDD of the image forming apparatus; creating a graph indicating an amount of usage of the HDD for each job type and a list including a job item representing job contents such as information of a job type for each of the jobs; and causing a display unit to display a job managing screen including the graph and the list. The operations further includes controlling the display unit, in response to an operation on one of the graph and the list to delete one or more of the jobs, to change dynamically an area on the other of the graph and the list with reflecting the deletion of the one or more of the jobs.

As described in the above description about background, an HDD of the image forming apparatus stores various job data for the purpose of reuse therein. A job managing apparatus configured to manage the amount of usage of the HDD and the amount of free storage of the HDD and secures the free space of the HDD by operations such as deleting data of needless jobs.

As a method for managing the amount of usage and the amount of free storage of a HDD, there is a method in which the amount of free storage is displayed in percentage or in number of sheets; however, it is difficult to intuitively grasp the amount of free storage by this measure. Instead, there is another method in which the amount of usage and the amount of free storage of a HDD is displayed in bars; however, the HDD of the image forming apparatus stores various kinds of job data such as print data before rasterizing, rasterized image data, scanned image data, and form data; thus it is difficult to decide which job data should be deleted even if the bars are referred to unless the amount of usage and the amount of free storage of the HDD is displayed based on proper sorting of those data.

Further, the image forming apparatus stores data to be used by an engine and data to be used by a controller in different HDDs therein in order to efficiently store various kinds of data. Thus, unless the amount of usage and the amount of free storage is displayed for each HDD, it is difficult to decide which piece of the job data stored in the HDDs should be deleted.

In addition, in the case of deleting the job data stored in a HDD, it is necessary to display a list of jobs and confirm details of each job, but if the amount of usage and the amount of free storage of the HDD and the list of the jobs are displayed in different screens, it is difficult to identify the job to be deleted. As a result, there is a possibility that unintended job data will be deleted; thus the operation for deleting job data will be complex.

Thus, according to an embodiment of the present invention, there is provided a non-transitory computer-readable medium storing therein instructions as an application program operable on an apparatus for managing jobs. The instructions, when executed by a processor of the apparatus for managing jobs, causing the processor to perform the following operations. The operations include acquiring information of job data stored in a HDD of a job processing apparatus (an image forming apparatus); and creating a graph indicating the amount of usage of the storing section for each job type (such as print, copy, scan and form) and a list including job contents for each job. The operations further include controlling a display unit to display a job managing screen including both of the graph and the list.

When the image forming apparatus includes plural HDDs (or when the HDD is divided into plural storing sections), there are provided a graph for each of the HDDs (or storing sections) so that a user can judge the amount of usage and the amount of free space of the each HDD (each storing section) properly. On the other hand, as for the list, since it is enough for a user to confirm the details of each job, the list shows the contents of jobs stored in the plural HDDs (storing sections) all together.

In this way, by confirming the graph showing the amount of usage of storage for each job type, a user of the job managing apparatus (a job administrator) can easily recognize the job of which job type should be deleted. In addition, by confirming the list displayed on the same screen to the graph, the user can select and delete a job easily, whereby the HDD(s) can be used efficiently by a simple and reliable operation to delete an intended job.

EXAMPLE

Figure 2A:
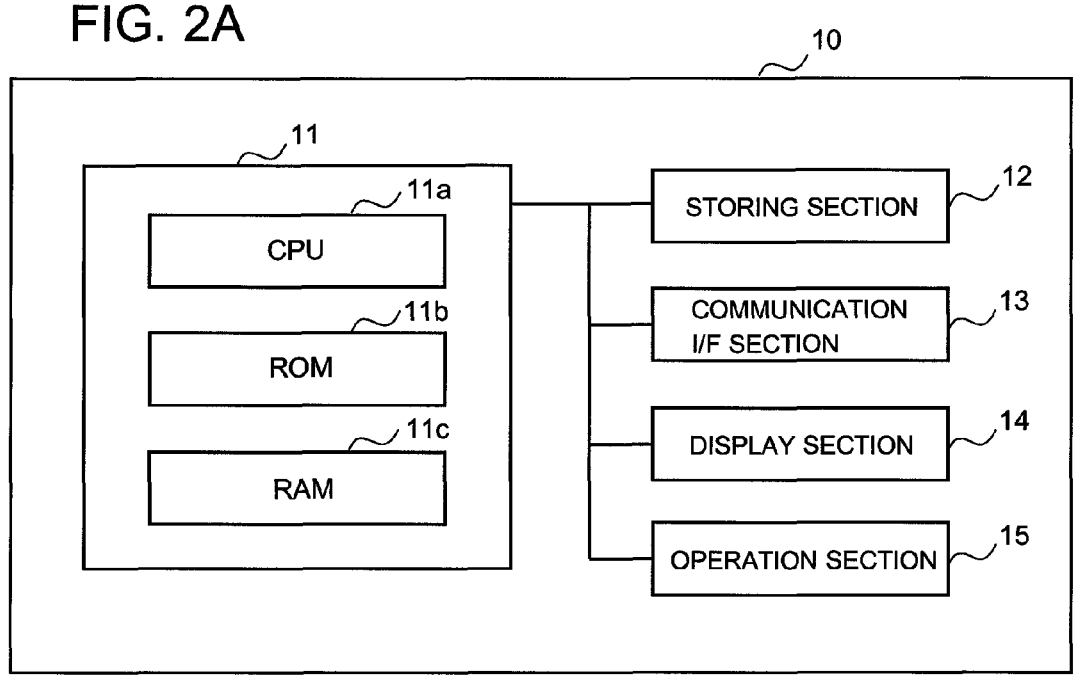
FIG. 2A is a block diagram illustrating a configuration of a job managing apparatus according to an embodiment of the present invention.
Figure 2B:
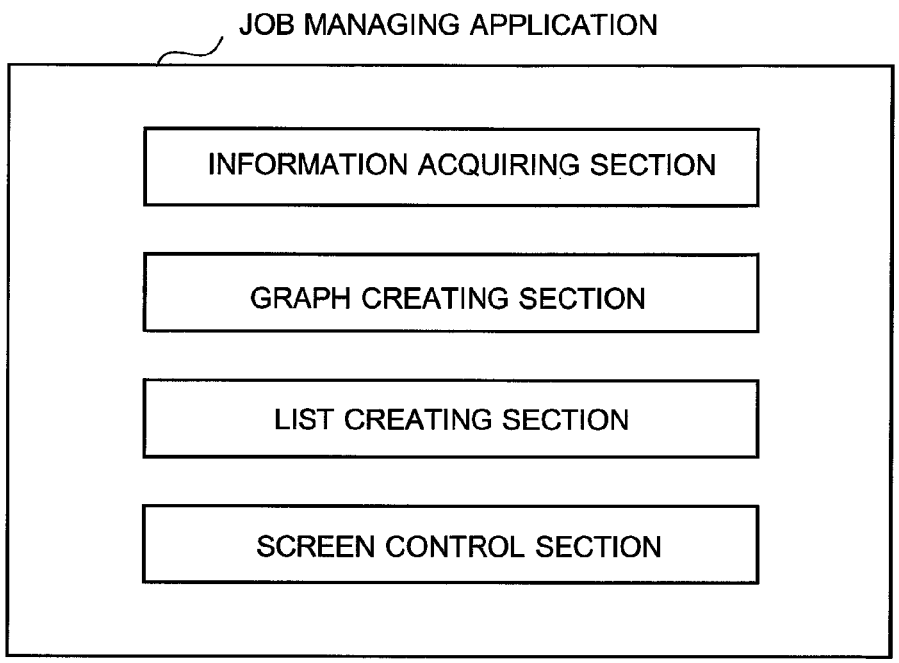
FIG. 2B is a block diagram illustrating a configuration of a job managing application according to an embodiment of the present invention.
Figure 2C:
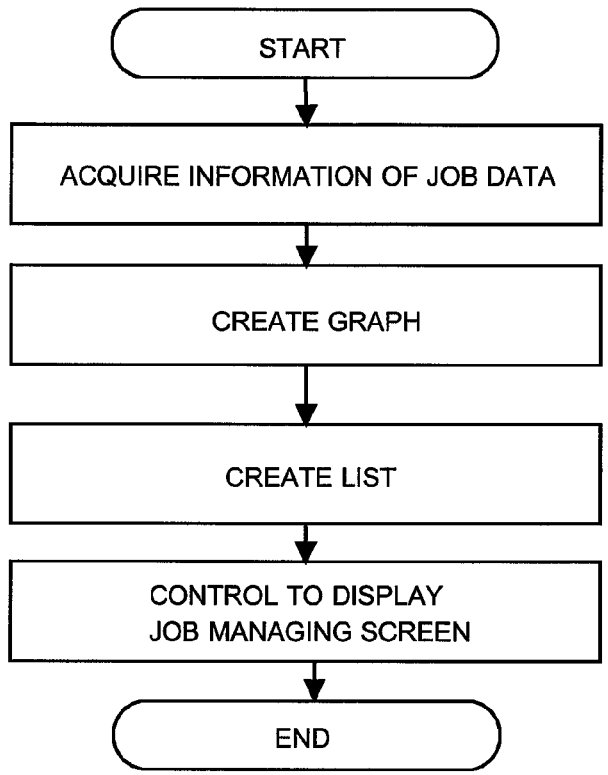
FIG. 2C is a flow chart illustrating operations of a job managing application according to an embodiment of the present invention.
Figure 3:
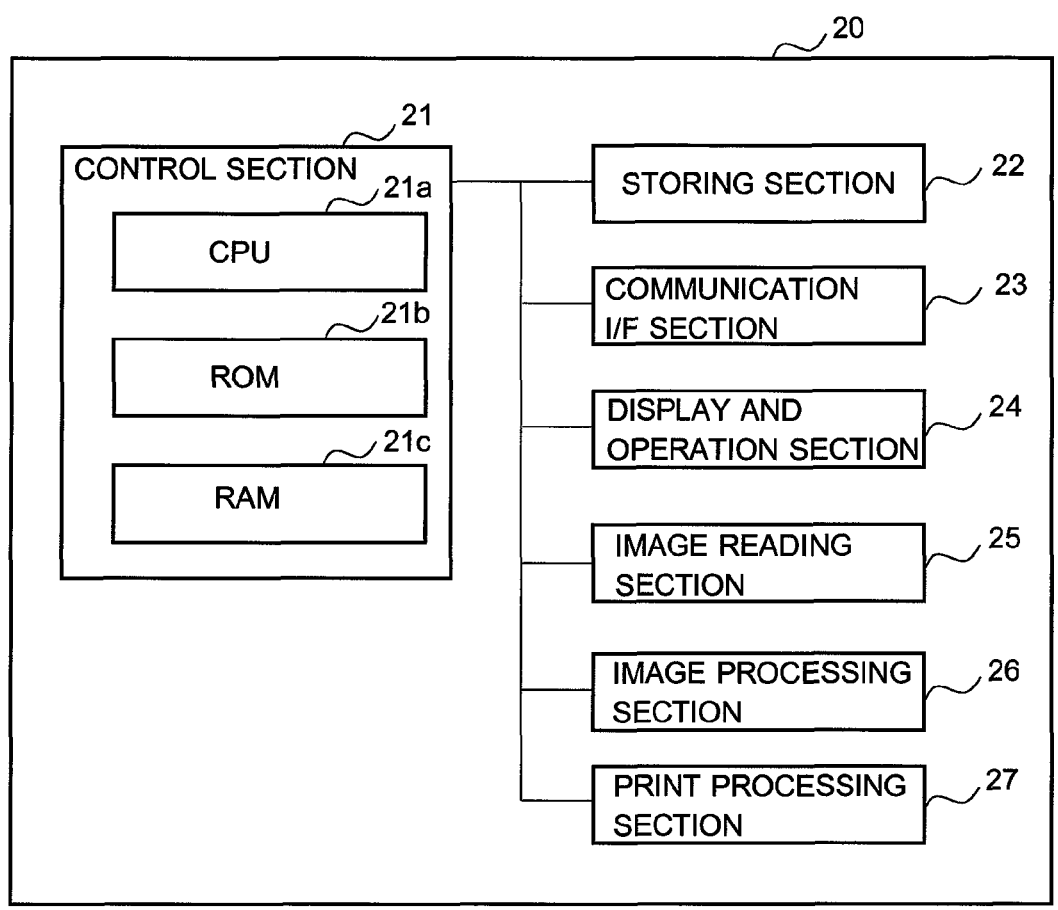
FIG. 3 is a block diagram illustrating a configuration of an image forming apparatus according to an embodiment of the present invention.
Figure 4:
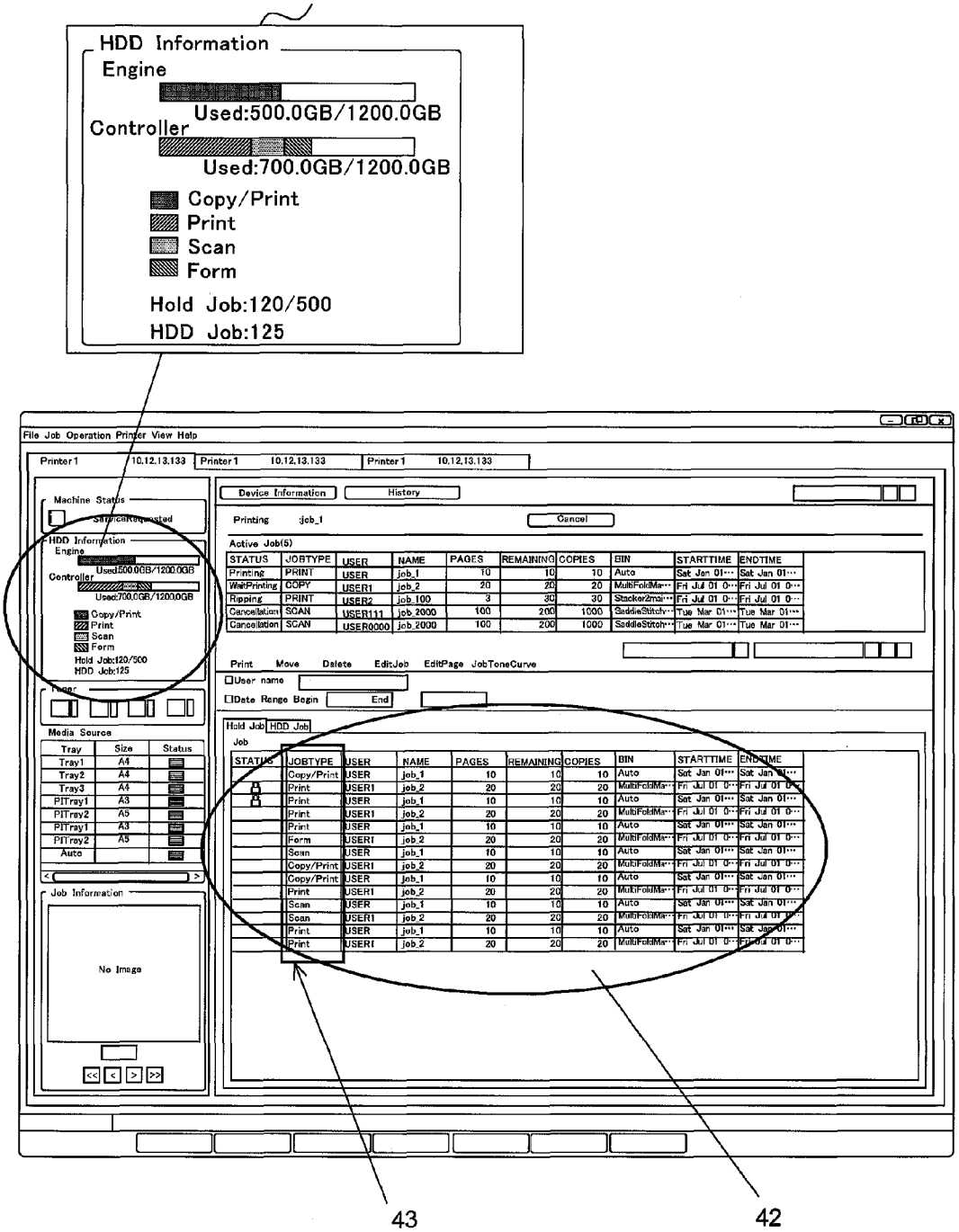
FIG. 4 is a diagram illustrating an example of a job managing screen according to an embodiment of the present invention.
Figure 11A:
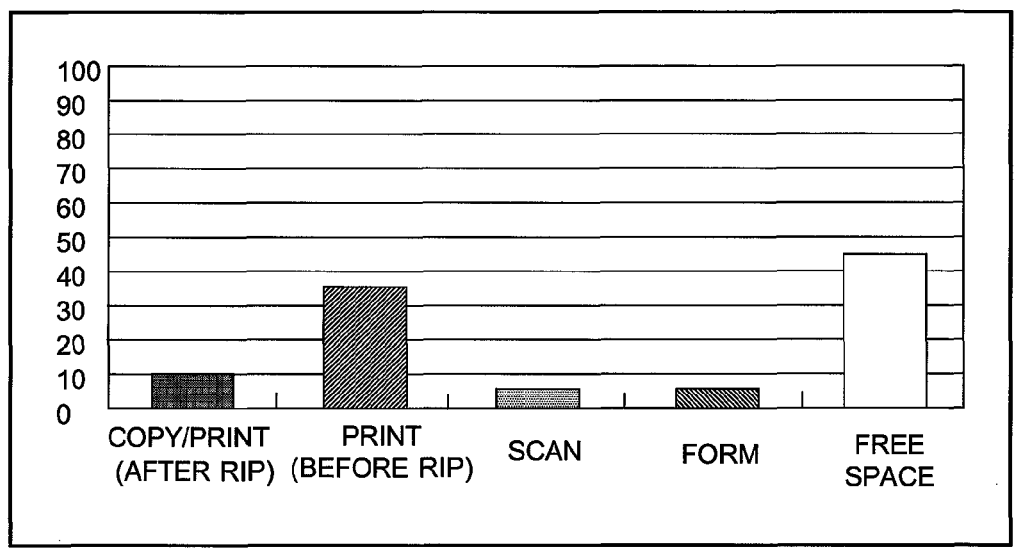
FIGS. 11A and 11B are diagrams illustrating another example of a graph display area on a job managing screen of an embodiment according to the present invention.
Figure 11B:
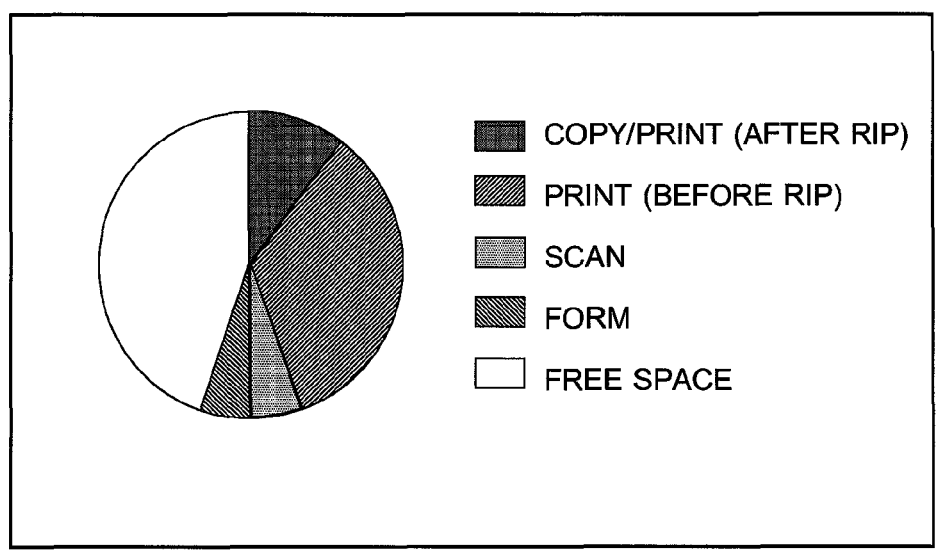

In order to describe in detail the above-described embodiment of the present invention, a job managing apparatus and instructions for managing jobs as a job managing application according to an embodiment of the present invention are described with reference to FIG. 1 to FIG. 11B. FIG. 1 is a diagram schematically illustrating a configuration of a printing system of the present example. FIG. 2A is a block diagram illustrating a configuration of a job managing apparatus of the present example. FIG. 2B is a block diagram illustrating a configuration of a job managing application of the present example. FIG. 2C is a flow chart illustrating operations of a job managing application of the present example. FIG. 3 is a block diagram illustrating a configuration of an image forming apparatus of the present invention. Further, FIG. 4 is a diagram illustrating an example of a job managing screen of the present example, and FIG. 5 to FIG. 10 are diagrams illustrating operations on the job managing screen. In addition, FIGS. 11A and 11B are diagrams showing other examples of a graph display area on the job managing screen.

As shown in FIG. 1, the printing system of the present example is constituted by a job processing apparatus (image forming apparatus 20) for processing a plurality of jobs including print, copy, and scan, and a computer device (job managing apparatus 10) for managing the jobs of the image forming apparatus 20. These are connected to each other through a communication network 30 such as a LAN (Local Area Network) and a WAN (Wide Area Network) defined by the standards such as Ethernet (Registered), Token Ring, and FDDI (Fiber-Distributed Data Interface), and others. Each device will be described in detail below.

Job Managing Apparatus:

As shown in FIG. 2A, the job managing apparatus 10 is constituted by components including a control section 11, a storing section 12, a communication I/F section 13, a display section 14, and an operation section 15.

The control section 11 is composed of a CPU (Central Processing Unit) 11a, a memory such as a ROM (Read Only Memory) 11b and a RAM (Random Access Memory) 11c. The CPU 11a reads out various programs including a program for controlling operations of the job managing apparatus 10, an OS (Operating System), a job managing application, and the like, from the ROM 11b or the storing section 12, and extends them on the RAM 11c to execute.

The job managing application program includes instructions causing the control section 11 to work as an information acquiring section, a graph creating section, a list creating section, and a screen control section, as shown in FIGS. 2B and 2C. The information acquiring section is configured to acquire information of job data stored in a storing section (HDDs in the present example) of the image forming apparatus 20. The graph creating section is configured to calculate the amount of usage of the HDDs for each job type based on the obtained information of job data and to create a graph indicating the amount of usage of each HDD for each job type. The list creating section is configured to create a list including job contents including information of a job type for each job based on the obtained information of job data. The screen control section is configured to control a display section, which is communicably connected to the control section 11, to display the graph created by the graph creating section and the list created by the list creating section on a job managing screen together.

The screen control section is configured to control the display section in response to operations on the job managing screen. For example, when an operation on the list to select a category of the job contents on the list is performed, the screen control section causes the display section to display the list with list items sorted in the order based on the job contents corresponding to the selected category. Alternatively, when an operation on the graph to select one of job types indicated on the graph is performed, the screen control section causes the display section to display only job items of the jobs belongs to the selected job type in the list, or to display details of the amount of disk usage for the selected job type. In addition, the screen control section configured to prompt a user to perform an operation to delete a job individually on the list, or perform an operation to delete jobs belonging to a job type together on the graph. Further, the screen control section controls the display section, when an operation to delete a job is performed on the list, to update the graph in conjunction with the list. The screen control section controls the display section, when an operation to delete a job type on the graph is performed, to update the list in conjunction with the graph.

The storing section 12 is composed of an HDD, and stores programs, screen data, and the like.

The communication I/F section 13 is composed of a component such as an NIC (Network Interface Card), and a modem, and acquires the information of data of jobs stored in the HDD through the communication network 30 from the image forming apparatus 20.

The display section 14 is composed of a device such as a liquid crystal display (LCD), and an organic EL (electroluminescence) display device, and displays the job managing screen thereon.

The operation section 15 is composed of a device such as a mouse and a keyboard, and enables a user to perform operations such as selecting jobs on the list on the job managing screen, selecting a job type on the graph, and deleting jobs.
Image Forming Apparatus:

As shown in FIG. 3, the image forming apparatus 20 is constituted by components including a control section 21, a storing section 22, a communication I/F section 23, a display and operation section 24, an image reading section (scanner) 25, an image processing section (controller) 26, a print processing section (engine) 27.

The control section 21 is composed of a CPU 21a and a memory including a ROM 21b and a RAM 21c. The CPU 21a reads out various programs from the ROM 21b or the storing section 22 and extends them on the RAM 21c to execute them to control operations of the whole of the image forming apparatus 20.

The storing section 22 is composed of an HDD and stores programs, job data of various job types (for example, print data before rasterizing (RIP), rasterized image data, scanned image data read in with an image reading section 25, and form data). The storing section 22 is composed of a plurality of HDDs (or a plurality of storing sections) in order to distinctively store the job data (the rasterized image data) to be used in the print processing section (engine) 27 and the job data (other than the rasterized image data) to be used in the image processing section (controller) 26.

The communication I/F section 23 is composed of a component such as an NIC and a modem and transmits job data stored in storing section 22 to the job managing apparatus 10 through the communication network 30.

The display and operation section 24 is equipped with a pressure-sensitive operation section (touch panel) having transparent electrodes arranged in a lattice on the display such as a liquid crystal display and an organic electro luminescence display. The display and operation section 24 is configured to display a screen for operating the image forming apparatus 20 and a screen for setting printing conditions to enable various settings and instructions to the apparatus.

The image reading section 25 is a section for optically reading image data from a document on a document table and includes a light source with which the document is scanned, an image sensor such as a CCD (Charge Coupled Devices) for converting the light reflected on the document into electric signals, and A/D converter for A/D conversion of the electric signals.

The image processing section 26 analyzes print data and rasterizes each page of the print data to generate image data for each page; or the image processing section 26 obtains image data of each page from the image reading section 25 and converts them into image data which can be printed in print processing section 27 after image processing (processing such as color adjustment, density adjustment, and size adjustment) or screening if necessary.

The print processing section 27 is composed of structural elements necessary for image forming by using an imaging process of an electrographic method or an electrostatic recording method and prints a print image, on a designated sheet, based on image data generated by the image processing section 26.

It should be noted that although the present example illustrates a configuration in which the job managing application program as instructions for managing jobs is executed by using the control section 11 of the job managing apparatus 10, the present example may also have a configuration in which the job managing application program as instructions for managing jobs is executed by using the control section 21 of the image forming apparatus 20. In this case, the job managing screen is displayed on the display and operation section 24 of the image forming apparatus 20.

In another way, the present example may have a configuration in which in addition to the job managing apparatus 10 and the image forming apparatus 20, a controller such as an RIP (Raster Image Processor) controller and a printer controller is connected to the communication network 30, and the job managing application program is executed by using the controller.

In reference to FIG. 4, a description will be made below on the job managing screen to be displayed on the display section 14 by the job managing application program.

FIG. 4 shows an example of the job managing screen 40. The job managing screen 40 shows various information of one or a plurality of image forming apparatuses 20 which are connected to the communication network 30. In the present example, the screen at least includes a graph display area 41 (the area circled on the left upper side of the drawing) and a list display area 42 (the area circled on the right lower side of the drawing). The graph display area 41 shows a graph (stacked bar graph here) indicating the amount of usage of each HDD of the image forming apparatus 20 for each job type. The list display area 42 shows a list describing job contents including information of a job type for each job.

The graph mentioned above is divided into a first graph (the upper graph) and a second graph (the lower graph). The first graph shows the amount of usage with respect to the total storage capacity of a first HDD (or a first storing section), where the first HDD is provided for storing data, for use in the print processing section (engine) 27, including copy or print data after being subjected to the RIP (hereinafter written as "Copy/Print"). The second graph shows the amount of usage with respect to the total storage capacity of a second HDD (or a second storing section), where the second HDD is provided for storing data, which are used in the image processing section (controller) 26, including print data before being subjected to the RIP (hereinafter written as "Print", scanned data (hereinafter written as "Scan"), and form data (hereinafter written as "Form"). In addition, in each graph, each job type has a different display style (in color and type of hatching) so that the amount of usage of the HDD for each job type is easy to be recognized.

Although the jobs are categorized into four job types of "Copy/Print", "Print", "Scan", and "Form" in this example, the jobs may be categorized into at least two job types. FIG. 4 shows a legend for cross-referencing the graph display and the job types, but the job types can be superposed on the graph or can be displayed using leader lines. Although the amount of usage, the total storage capacity, and the job number are displayed in numerical values in this example, these do not have to be displayed on the screen.

The above-mentioned list includes job items for respective jobs (rows of the list) and shows various types of detailed information of each job in plural columns. The columns include a job type field 43 ("JOBTYPE" in the second column, refer to the rectangular frame in FIG. 4) indicating the type of each job. The job type field 43 cross-references the list and the graph. By selecting a job on the list, for example, by clicking a mouse on a job item of the list, a user can delete jobs one by one. In addition, by clicking a mouse on the list with the control key pressed, a user can select and delete a plurality of jobs; and by clicking a mouse on the list with the shift key pressed, a user can select and delete a plurality of neighboring jobs simultaneously.

It should be noted that detailed information of jobs other than the "JOBTYPE" is optional and at least the information which is necessary to decide to delete or not to delete a job has only to be included in each job item. Further, the present example has a configuration in which the list is separated into two tabs to be displayed, one of which is a "Hold Job" tab for showing a list of the jobs (jobs for which job tickets and pages can be edited or tone curves can be adjusted) stored in a temporary storage area, and one of which is a "HDD Job" tab showing a list of the jobs (jobs for which the above edit or adjustment are impossible) stored in a permanent storage area; however, these may be displayed all together on the screen.

Regarding the correlation between the graph and the list, there may be employed a configuration in which all the jobs belonging to the job types displayed on the graph are displayed on the list (the graph and the list are consistent to each other); there may be employed a configuration in which a part of the jobs belonging to the job types displayed on the graph is displayed on the list (for example, jobs not allowed to be deleted are not displayed on the list); or there may be employed a configuration in which jobs belonging to a part of the job types displayed on the graph are displayed on the list (for example, jobs of a certain job type such as form are not displayed on the list).

The basic configuration and the basic method of deleting jobs are described above; however, the job managing application program of the present example may cause the control section to perform various controls so as to allow a user to manage jobs easily.

For example, for displaying all the job items on the list, the order to display the job items can be set to any order such as the order of registration time of the jobs to the HDD and the alphabetic order of their names; however, for deleting jobs belonging to a certain job type, the job items are preferably sorted and displayed on the basis of job type. Assuming the condition that job items are displayed in the order shown in FIG. 5A, in response to an operation, such as a click of a mouse, to select "JOB TYPE" in a category bar 44 shown in the top part of the list, the screen control section sorts the job items according to information of the job types as shown in the job type field 43 of FIG. 5B to display them on the screen. By performing the control of rearrangement in this way, the screen control section allows a user to select jobs to be deleted efficiently.

Figure 6A:
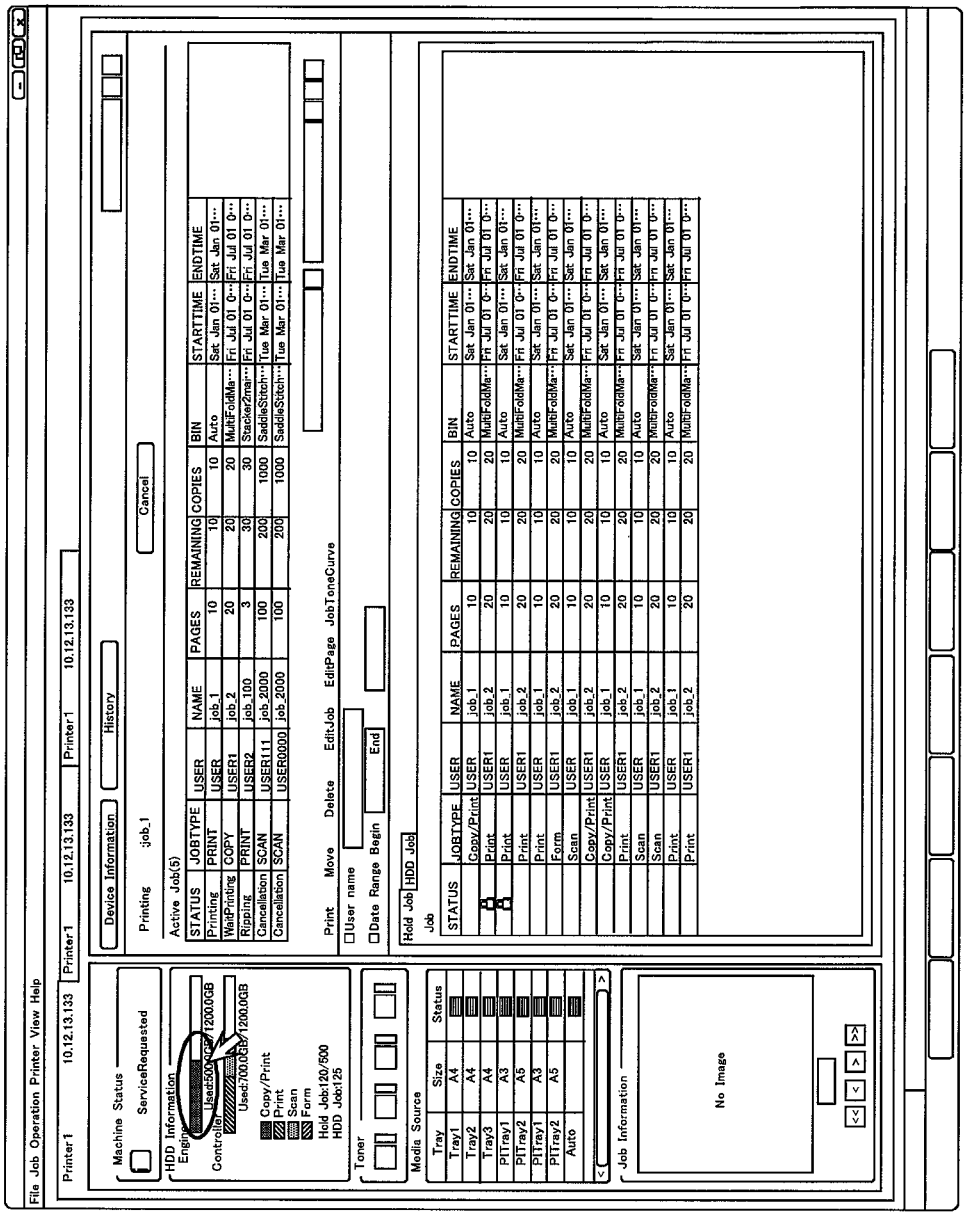
FIG. 6A is a diagram illustrating an operation example on a graph display area on a job managing screen according to an embodiment of the present invention.
Figure 6B:
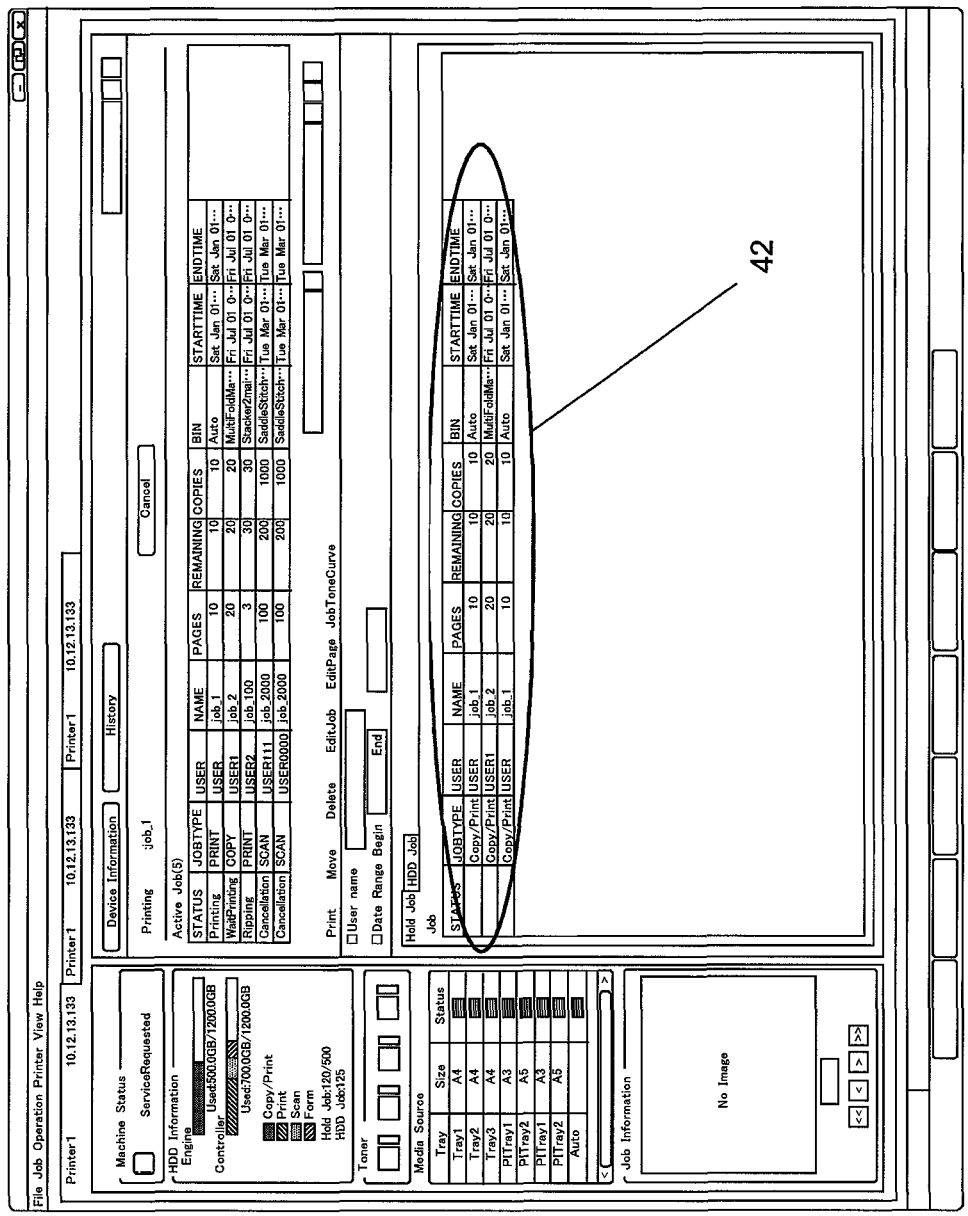
FIG. 6B is a diagram illustrating a display example of a list display area on a job managing screen according to an embodiment of the present invention.

The jobs belonging to all the job types indicated on the graph are displayed on the list in FIG. 4; however, when deleting only jobs belonging to a certain job type, it is more convenient that only the jobs belonging to the job type are displayed on the list. Assuming that jobs belonging to all the job type are displayed on the list as shown in FIG. 6A, in response to an operation, such as a click of a mouse, to select an area corresponding to one of the job types on the graph, the screen control section displays only the jobs belonging to the selected job type as shown in the list display area 42 of FIG. 6B. By performing the display control in this way, the screen control section allows a user to select jobs to be deleted efficiently, which prevents an inconvenient erroneous selection of the jobs not to be deleted before it happens.

Figure 7A:
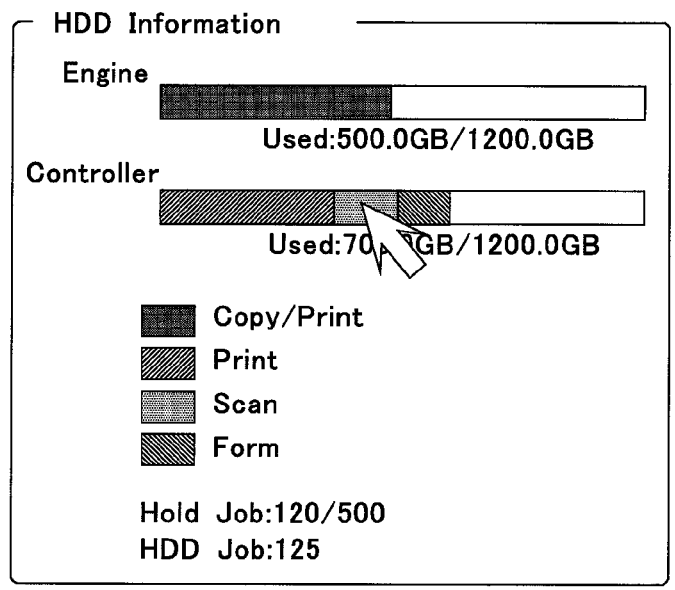
FIG. 7A is a diagram illustrating an operation example on a graph display area on a job managing screen of an embodiment according to the present invention.
Figure 7B:
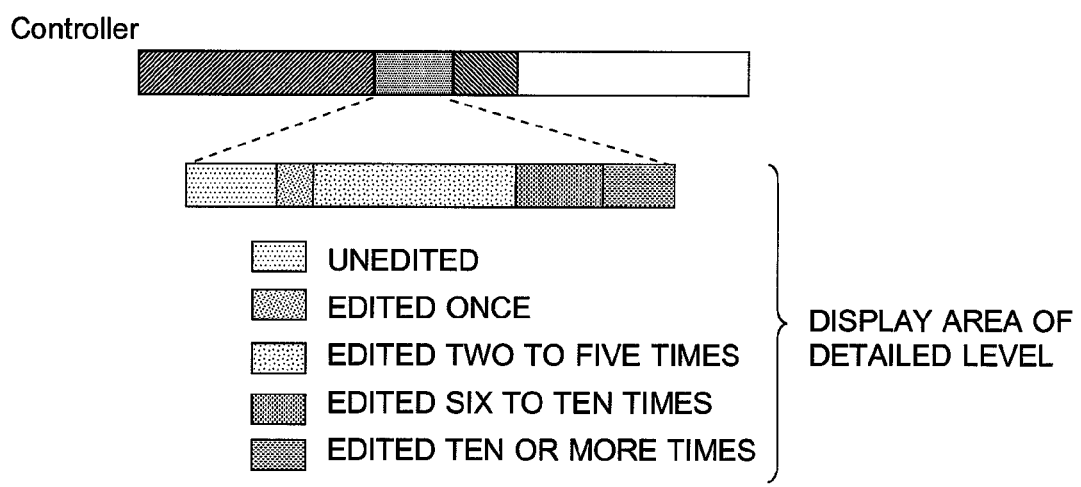
FIG. 7B is a diagram illustrating a display example of a graph display area on a job managing screen of an embodiment according to the present invention.
Figure 10:
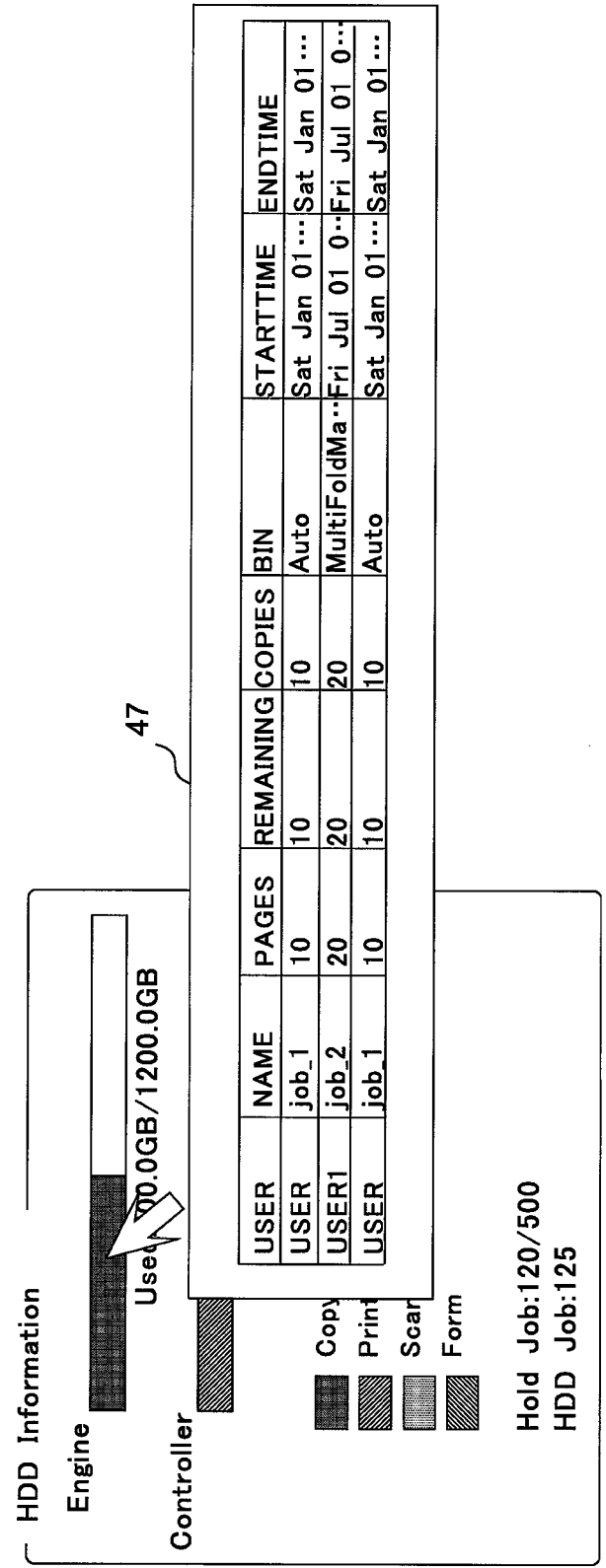
FIG. 10 is a diagram illustrating another operation example for deleting a job on a graph display area on a job managing screen of an embodiment according to the present invention.

The four job types of "Copy/Print", "Print", "Scan", and "Form" are displayed on the graph in FIGS. 4 to 6B; however, in the case that information of the job types can be hierarchically displayed on the graph, it is inconvenient to identify the jobs if only job types of the upper level are displayed. Instead, the graph is not easy to recognize if all the information of the detailed level is displayed thereon. To address this issue, assuming that the four job types are displayed on the graph as shown in FIG. 7A, in response to an operation, such as a click of a mouse, to select one of the job types, the screen control section causes the display section to display another graph of the detailed level for the selected job type as shown in FIG. 7B so as to allow a user to recognize the details of jobs belonging to that job type. By displaying information of the detailed level of the job types in this way on the graph, the screen control section allows a user to visually determine whether the selected job type includes jobs to be deleted or not and to select the jobs to be deleted without errors.

In FIGS. 7A and 7B, the original graph and the graph showing the detailed level are displayed side by side; however, the way to show the information of the detailed level can be arbitrary; thus, the screen control section may be configured to cause the display section to display the graph of the detailed level on another screen, or to display the details of the detailed level may be displayed in characters, for example. In addition, for displaying the information of the detailed level, the screen control section may be configured to allow a user to set the conditions for displaying information of the detailed level. For example, the screen control section may cause the display section to display a display condition setting screen 45 as shown in FIG. 8, so as to display information of the detailed level according to the conditions selected by a user on the display condition setting screen.

FIG. 4 shows the configuration in which jobs to be deleted are selected on the list; however, when deleting all the jobs belonging to a certain job type, it is cumbersome for a user to select those jobs on the list. To address this issue, the screen control section may perform, in response to a predetermined operation, such as a right click of a mouse placed in an area of one of the job types, as shown in FIG. 9, a control to display a menu screen 46 for selecting operations for the job type, and may perform, in response to a selection of the menu item "DELETE" in the menu screen 46, a control to delete jobs belonging to the job type and update the graph and the list corresponding to that. As described above, the screen control section is configured to prompt a user to perform an operation on the graph to delete jobs belonging to the job type, which allows a user to delete a plurality of jobs reliably by a simple operation.

Further, the screen control section may perform a control, in response to an operation, such as a click of a mouse, on the graph to select the area of the job type on the graph, to display a job list 47 of jobs belonging to the selected job type so as to prompt a user to delete a job selectively or delete plural jobs together in the screen and to update the graph and the list. As described above, the screen control section is configured to display another screen indicating jobs belonging to the job type selected on the graph, which allows a user to delete jobs reliably by a simple operation.

While the present example of the present invention have been described using specific terms, such description is for illustrative purpose only, and it is to be understood that changes and variations may be made without depending from the spirit or scope of the appended claims.

For example, FIG. 4 shows a stacked bar graph for showing the accumulation of the amount of usage of the HDD for each job type; however, the type of the graph is not limited to a stacked bar graph, and any type of the graph can be used as long as the amount of usage of the HDD type can be recognized therein for each job type. For example, as shown in FIG. 11A, a vertical grouped bar graph may be used, wherein each vertical bar shows the amount of usage of the HDD for each job type. As another example, as shown in FIG. 11B, a pie chart may be used, wherein each sector covers an area of the circle according to the amount of usage of the HDD for each job type.

According to the above-described embodiment, a job can be deleted by any user; however, with this configuration jobs to be kept can be carelessly deleted. In order to address this issue, the ID of a user having an authority to delete jobs may be preliminarily registered, and the job managing application may cause the job managing apparatus 10 to accept an operation to delete a job under the condition that the ID of the user having logged in the job managing apparatus 10 agrees with the previously registered ID. In this case, the job managing application may cause the job managing apparatus not to display the job managing screen 40 under the condition that a user other than the registered users is logged in the job managing apparatus 10, or not to accept the operation to delete a job while displaying the job managing screen 40 on the display section.

The invention claimed is:

1. A non-transitory computer-readable medium storing instructions for managing jobs of an image forming apparatus, the instructions, when executed by a processor, causing the processor to perform operations comprising:
acquiring information about data of jobs stored in a storing section of the image forming apparatus;
creating a graph based on the information about the data of the jobs, the graph indicating an amount of usage of the storing section for each job type;
creating a list based on the information about the data of the jobs, the list including a job item representing job contents for each of the jobs, the job contents including information of a job type; and
controlling a display unit communicably connected to the processor to: (i) display a job managing screen including the graph and the list, and (ii) update an area of the graph on the job managing screen in response to an operation on the list to delete one or more of the jobs, the area indicating an amount of usage of the storing section corresponding to a job type to which the one or more of the jobs belong,
wherein the storing section of the image forming apparatus comprises a first storing section for storing rasterized data among the data of the jobs and a second storing section for storing data other than the storing data among the data of the jobs;
wherein the creating the graph comprises creating a first graph for the first storing section and a second graph for the second storing section, and
wherein the controlling the display unit comprises controlling the display unit to display a job managing screen including the first graph, the second graph and the list.

2. The non-transitory computer-readable medium of claim 1, wherein the controlling the display unit comprises controlling the display unit, in response to an operation on the list to select a category of the job contents, to update the list with the job items sorted according to the job contents belonging to the category.

3. The non-transitory computer-readable medium of claim 1, wherein the controlling the display unit comprises controlling the display unit, in response to an operation on one of the first graph and the second graph to select one of job types indicated on the one of the first graph and the second graph, to update the list so as to consist of job items for jobs belonging to the one of the job types.

4. The non-transitory computer-readable medium of claim 1, wherein the controlling the display unit comprises controlling the display unit, in response to an operation on one of the first graph and the second graph to select one of job types indicated on the one of the first graph and the second graph, to display details of the usage of the storing section for the one of the job types.

5. The non-transitory computer-readable medium of claim 1, wherein the controlling the display unit comprises controlling the display unit, in response to a predetermined operation for one of job types indicated on one of the first graph and the second graph, to display a menu screen including a menu item for a delete instruction so as to prompt a user to perform an operation to delete jobs belonging to the one of the job types together on the menu screen.

6. The non-transitory computer-readable medium of claim 1, wherein the controlling the display unit comprises controlling the display unit, in response to an operation on one of the first graph and the second graph to select one of job types indicated on the one of the first graph and the second graph, to further display a screen including a second list including a job item representing job contents for each of jobs belonging to the one of the job types so as to prompt a user to perform an operation to delete one or more jobs on the second list.

7. The non-transitory computer-readable medium of claim 1, wherein the controlling the display unit comprises accepting an operation to delete one or more of the jobs under a condition that a registered user logs in a job managing apparatus including the processor to perform the operation.

8. The non-transitory computer-readable medium of claim 1, wherein the controlling a display unit comprises controlling a touch panel of the image forming apparatus to display the job managing screen.

9. A job managing apparatus for managing jobs of an image forming apparatus, the job managing apparatus comprising:
a display section;
an information acquiring section configured to acquire information about data of jobs stored in a storing section of the image forming apparatus;
a graph creating section configured to create a graph based on the information about the data of the jobs, the graph indicating an amount of usage of the storing section for each job type;
a list creating section configured to create a list based on the information about the data of the jobs, the list including a job item representing job contents for each of the jobs, the job contents including information of a job type; and
a screen control section configured to control the display section to: (i) display a job managing screen including the graph and the list, and (ii) update an area of the graph on the job managing screen in response to an operation on the list to delete one or more of the jobs, the area indicating an amount of usage of the storing section corresponding to a job type to which the one or more of the jobs belong,
wherein the storing section of the image forming apparatus comprises a first storing section for storing rasterized data among the data of the jobs and a second storing section for storing data other than the storing data among the data of the jobs, wherein the list creating section is configured to create a first graph for the first storing section and a second graph for the second storing section, and wherein the screen control section is configured to control the display section to display a job managing screen including the first graph, the second graph and the list.

10. The job managing apparatus of claim 9, wherein the screen control section is configured to control the display section, in response to an operation on the list to select a category of the job contents, to update the list with the job items sorted according to the job contents belonging to the category.

11. The job managing apparatus of claim 9, wherein the screen control section is configured to control the display section, in response to an operation on one of the first graph and the second graph to select one of job types indicated on the one of the first graph and the second graph, to update the list so as to consist of job items for jobs belonging to the one of the job types.

12. The job managing apparatus of claim 9, wherein the screen control section is configured to control the display section, in response to an operation on one of the first graph and the second graph to select one of job types indicated on the one of the first graph and the second graph, to display details of the usage of the storing section for the one of the job types.

13. The job managing apparatus of claim 9, wherein the screen control section is configured to control the display section, in response to a predetermined operation for one of job types indicated on one of the first graph and the second graph, to display a menu screen including a menu item for a delete instruction so as to prompt a user to perform an operation to delete jobs belonging to the one of the job types together on the menu screen.

14. The job managing apparatus of claim 9, wherein the screen control section is configured to control the display section, in response to an operation on one of the first graph and the second graph to select one of job types indicated on the one of the first graph and the second graph, to further display a screen including a second list including a job item representing job contents for each of jobs belonging to the one of the job types so as to prompt a user to perform an operation to delete one or more jobs on the second list.

15. The job managing apparatus of claim 9, wherein the screen control section is configured to accept an operation to delete one or more of the jobs under a condition that a registered user logs in the job managing apparatus to perform the operation.

16. A non-transitory computer-readable medium storing instructions for managing jobs of an image forming apparatus, the instructions, when executed by a processor, causing the processor to perform operations comprising:

acquiring information about data of jobs stored in a storing section of the image forming apparatus;

creating a graph based on the information about the data of the jobs, the graph indicating an amount of usage of the storing section for each job type;

creating a list based on the information about the data of the jobs, the list including a job item representing job contents for each of the jobs, the job contents including information of a job type; and controlling a display unit communicably connected to the processor to: (i) display a job managing screen including the graph and the list, and (ii) update an area of the graph on the job managing screen in response to an operation on the list to delete one or more of the jobs, the area indicating an amount of usage of the storing section corresponding to a job type to which the one or more of the jobs belong, wherein the controlling the display unit comprises controlling the display unit, in response to an operation on the graph to select one of job types indicated on the graph, to further display a screen including a second list including a job item representing job contents for each of jobs belonging to the one of the job types so as to prompt a user to perform an operation to delete one or more jobs on the second list.

17. A job managing apparatus for managing jobs of an image forming apparatus, the job managing apparatus comprising:

a display section;

an information acquiring section configured to acquire information about data of jobs stored in a storing section of the image forming apparatus;

a graph creating section configured to create a graph based on the information about the data of the jobs, the graph indicating an amount of usage of the storing section for each job type;

a list creating section configured to create a list based on the information about the data of the jobs, the list including a job item representing job contents for each of the jobs, the job contents including information of a job type; and a screen control section configured to control the display section to: (i) display a job managing screen including the graph and the list, and (ii) update an area of the graph on the job managing screen in response to an operation on the list to delete one or more of the jobs, the area indicating an amount of usage of the storing section corresponding to a job type to which the one or more of the jobs belong, wherein the screen control section is configured to control the display section, in response to an operation on the graph to select one of job types indicated on the graph, to further display a screen including a second list including a job item representing job contents for each of jobs belonging to the one of the job types so as to prompt a user to perform an operation to delete one or more jobs on the second list.

* * * * *